(12) United States Patent
Werner

(10) Patent No.: US 7,503,619 B2
(45) Date of Patent: Mar. 17, 2009

(54) LIFTGATE FRAME

(75) Inventor: Mark F. Werner, LaSalle (CA)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 10/576,863

(22) PCT Filed: Oct. 22, 2004

(86) PCT No.: PCT/US2004/035145

§ 371 (c)(1),
(2), (4) Date: Jun. 19, 2006

(87) PCT Pub. No.: WO2005/042287

PCT Pub. Date: May 12, 2005

(65) Prior Publication Data

US 2007/0046060 A1   Mar. 1, 2007

Related U.S. Application Data

(60) Provisional application No. 60/613,653, filed on Oct. 23, 2003.

(51) Int. Cl.
*B60J 5/10* (2006.01)
(52) U.S. Cl. .................... 296/146.8; 296/51; 296/106
(58) Field of Classification Search ............... 296/50, 296/56, 201, 202, 146.8, 146.11, 51, 106, 296/30, 205, 193.06; 49/163, 169, 170
See application file for complete search history.

(56) References Cited

U.S. PATENT DOCUMENTS

| 3,612,601 A | * | 10/1971 | Himka et al. ............. 296/51 |
| 6,053,562 A |   | 4/2000  | Bednarski |
| 6,220,649 B1 | * | 4/2001 | Rife ..................... 296/146.12 |
| 6,719,356 B2 | * | 4/2004 | Cleland et al. ........... 296/146.8 |
| 6,776,449 B2 | * | 8/2004 | Komatsu et al. ......... 296/146.5 |
| 6,805,398 B2 | * | 10/2004 | Harima et al. .......... 296/146.7 |
| 6,983,968 B2 | * | 1/2006 | Brauer et al. ................ 296/3 |
| 7,025,166 B2 | * | 4/2006 | Thomas .................... 180/311 |
| 7,032,958 B2 | * | 4/2006 | White et al. ........... 296/193.01 |
| 2002/0060479 A1 |  | 5/2002 | Tolinski et al. |

FOREIGN PATENT DOCUMENTS

| DE | 196 15 540 A1 | 4/1997 |
| DE | 19615540 A1 * | 4/1997 |
| DE | 197 13 317 A1 | 10/1998 |
| DE | 200 01 554 U1 | 3/2000 |
| DE | 199 385 11 A1 | 2/2001 |

OTHER PUBLICATIONS

English translation of DE 19938511. and DE19713317 from the European Patent Office website.*

* cited by examiner

*Primary Examiner*—Dennis H Pedder
*Assistant Examiner*—Melissa A Black
(74) *Attorney, Agent, or Firm*—Harness, Dickey & Pierce, P.L.C.

(57) ABSTRACT

A frame (18) for a liftgate (10) of a motor vehicle includes an upper frame member (24) and a generally U-shaped lower frame member (26). The upper frame member is adapted to be pivotally secured (33, 35) to the motor vehicle. The lower frame member (26) is fixedly secured to the upper frame member (24). The lower frame member (26) is integrally formed, and includes spaced apart vertical segments (36, 38) and a horizontal segment (40) extending therebetween for supporting the liftgate as the liftgate opens and closes.

22 Claims, 5 Drawing Sheets

LIFTGATE FRAME

This application claims priority from U.S. Provisional Patent Application 60/513,653 filed Oct. 23, 2003, the entirety of which is incorporated herein by reference thereto.

BACKGROUND OF THE INVENTION

1. Field of the Invention

This invention relates to a liftgate of a motor vehicle. More particularly, the invention relates to a liftgate frame adapted to provide support for a liftgate through multiple opening positions.

2. Description of the Related Art

Certain motor vehicles, including station wagons, sport utility vehicles, and minivans, have a rear opening through which access to an interior of the motor vehicle is gained. The rear opening extends between a floor and a roof of the motor vehicle to allow for loading and unloading of items. Typically, a liftgate is pivotally secured to the motor vehicle to selectively cover the rear opening. To fully cover the rear opening, the liftgate must extend between the floor and the roof of the motor vehicle. Consequently, the liftgate can be large and heavy, making it difficult for some individuals to open and close the liftgate.

To ease this difficulty, liftgates have been developed that include a window or flipglass pivotally hinged thereto such that the window can be moved independent of the liftgate. A user thus has the option of opening only the window, which is relatively lightweight, in order to gain access to a portion of the rear opening. This access to a portion of the rear opening is generally sufficient for storage and removal of smaller items. As a result, the liftgate must be opened and closed only in those instances when access to the entire rear opening is needed, that is, during loading and unloading of larger items.

Another consideration in liftgate design is driver visibility out the rear of the motor vehicle. Existing liftgates are typically two-piece, stamped metal components having inner and outer stampings, which restricts visibility through the rear opening.

Thus, it would be desirable to provide a compact liftgate frame that supports a liftgate through multiple opening positions and increases rear visibility.

SUMMARY OF THE INVENTION

A frame for a liftgate of a motor vehicle includes an upper frame member and a generally U-shaped lower frame member. The upper frame member is adapted to be pivotally secured to the motor vehicle. The lower frame member is fixedly secured to the upper frame member. The lower frame member is integrally formed and includes spaced apart vertical segments and a horizontal segment extending therebetween for supporting the liftgate as the liftgate opens and closes.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
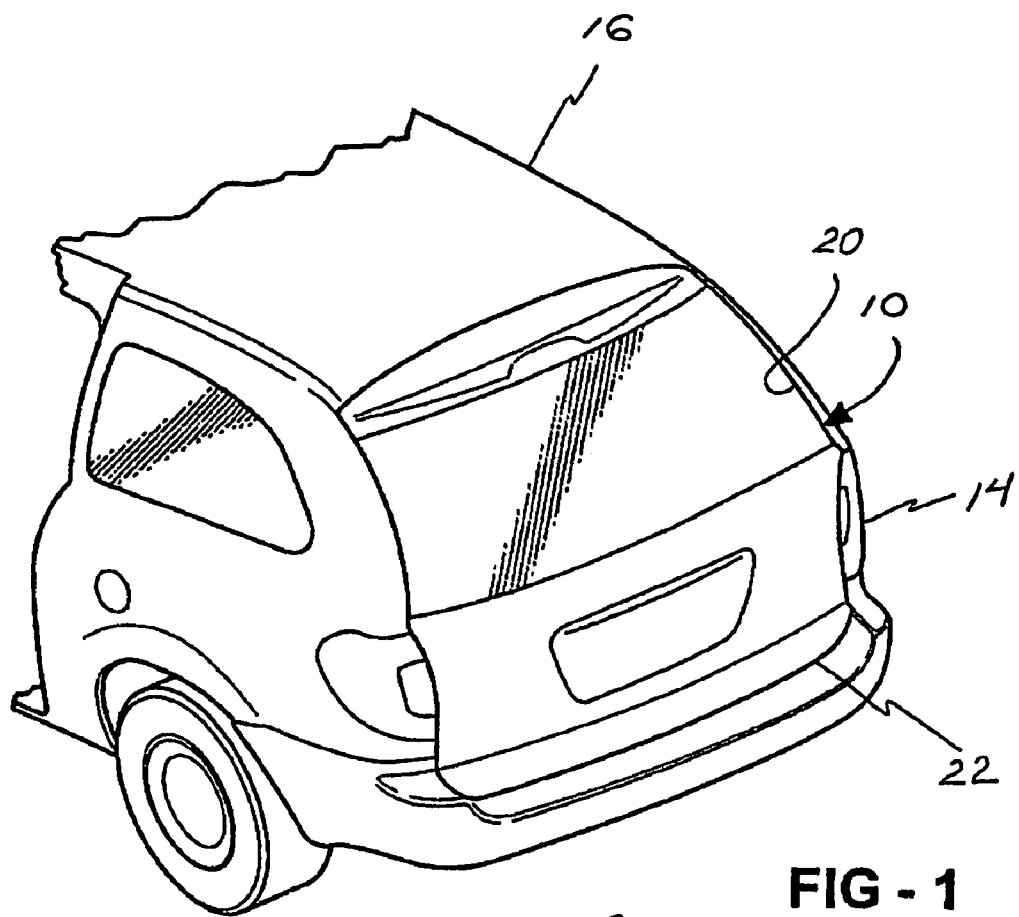
FIG. 1 is a fragmentary, rear perspective view of a motor vehicle including a liftgate in a closed position.
Figure 2:
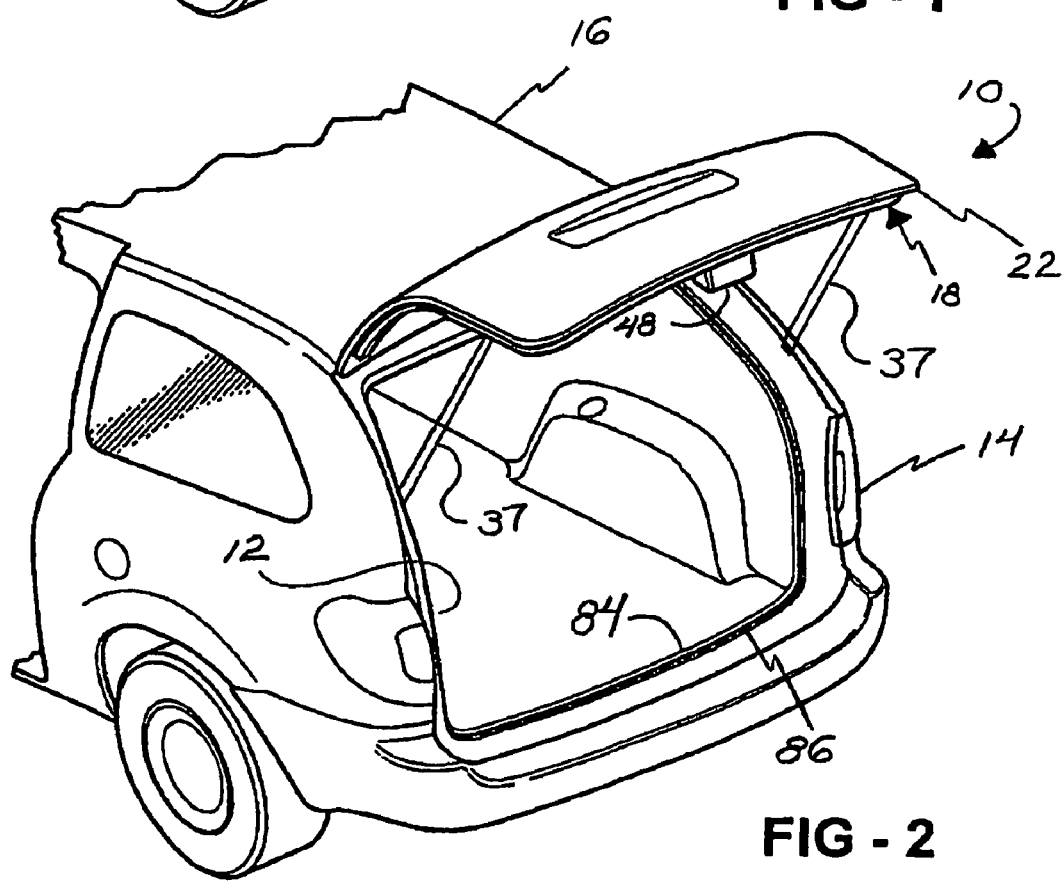
FIG. 2 is a fragmentary, rear perspective view of the motor vehicle including the liftgate in an open position.
Figure 3:
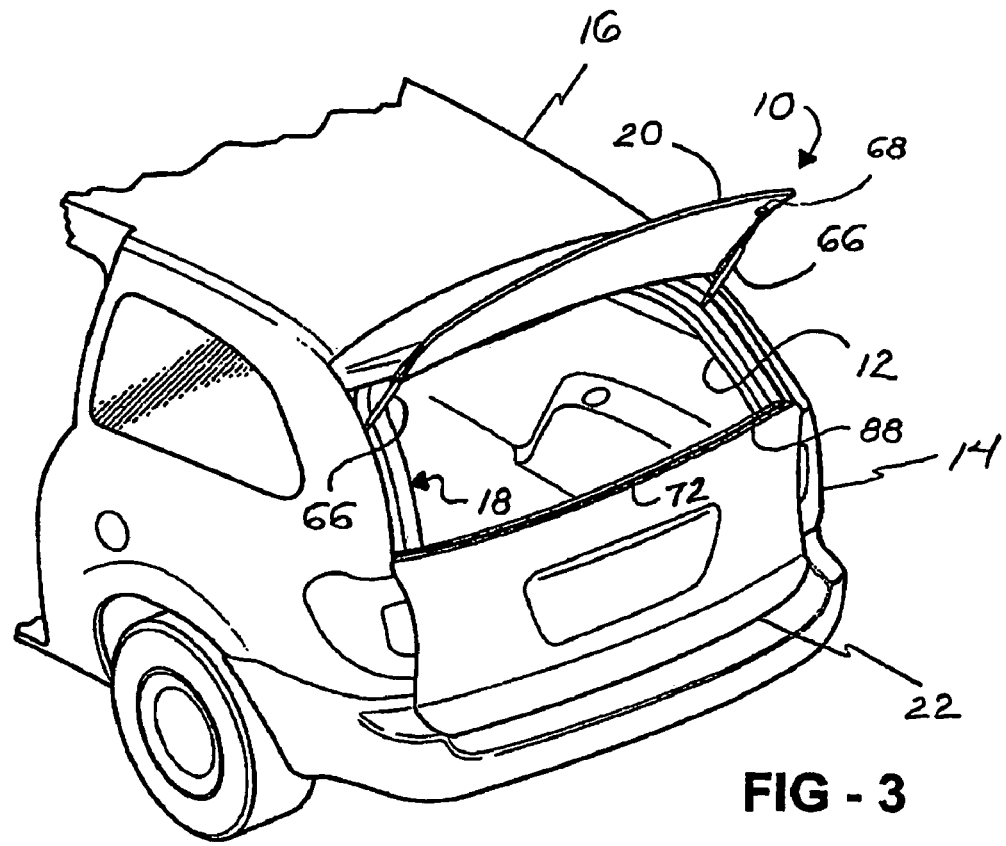
FIG. 3 is a fragmentary, rear perspective view of the motor vehicle including the liftgate in a window open position.
Figure 4:
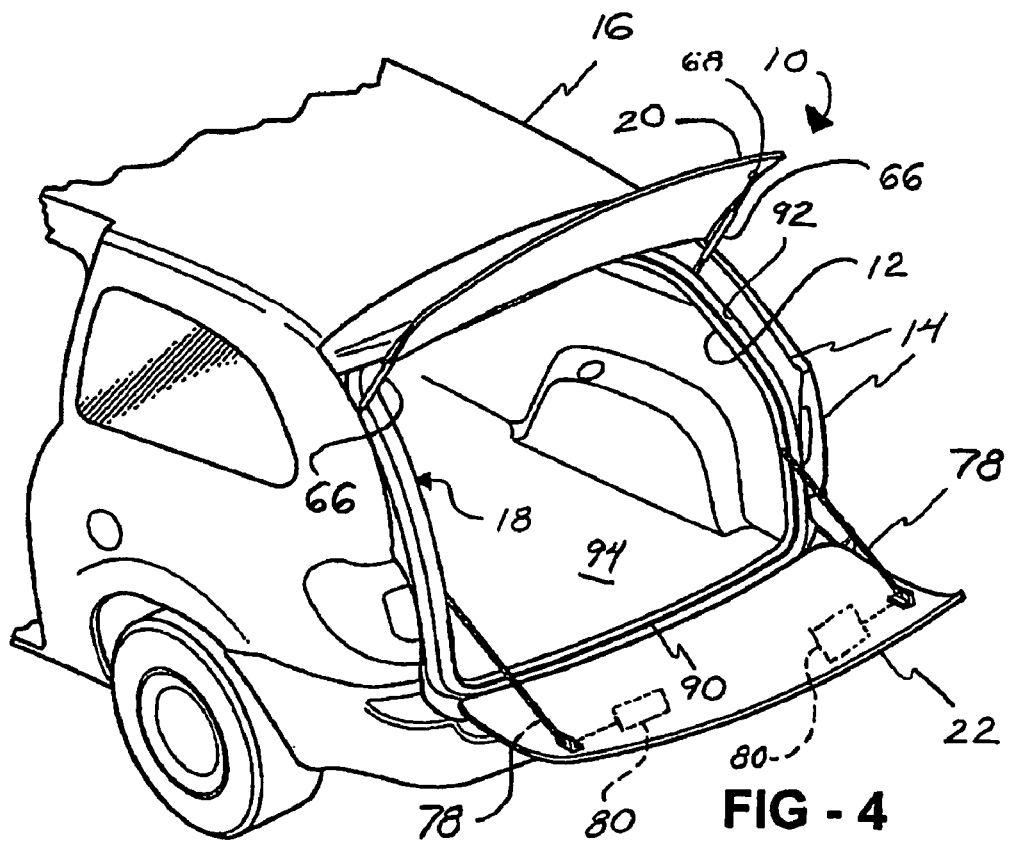
FIG. 4 is a fragmentary, rear perspective view of the motor vehicle including the liftgate in a tailgate open position and a liftgate frame according to the invention disposed along the motor vehicle.

Referring to FIGS. 1 through 4, a liftgate, generally shown at 10, selectively covers an opening 12 along a rear portion 14 of a motor vehicle 16. The liftgate 10 includes a liftgate frame, generally indicated at 18, which is adapted to be pivotally secured to the motor vehicle 16. The liftgate 10 also includes a window or flipglass 20 pivotally hinged to and supported by the frame 18. The liftgate 10 further includes a tailgate 22, which is also pivotally hinged to and supported by the frame 18. The various pivoting elements allow the liftgate 10 to move between a closed position (FIG. 1), an open position (FIG. 2), a window open position (FIG. 3), and a tailgate open position (FIG. 4). It is appreciated that the various pivoting elements may be manually or power operated.

Figure 5:
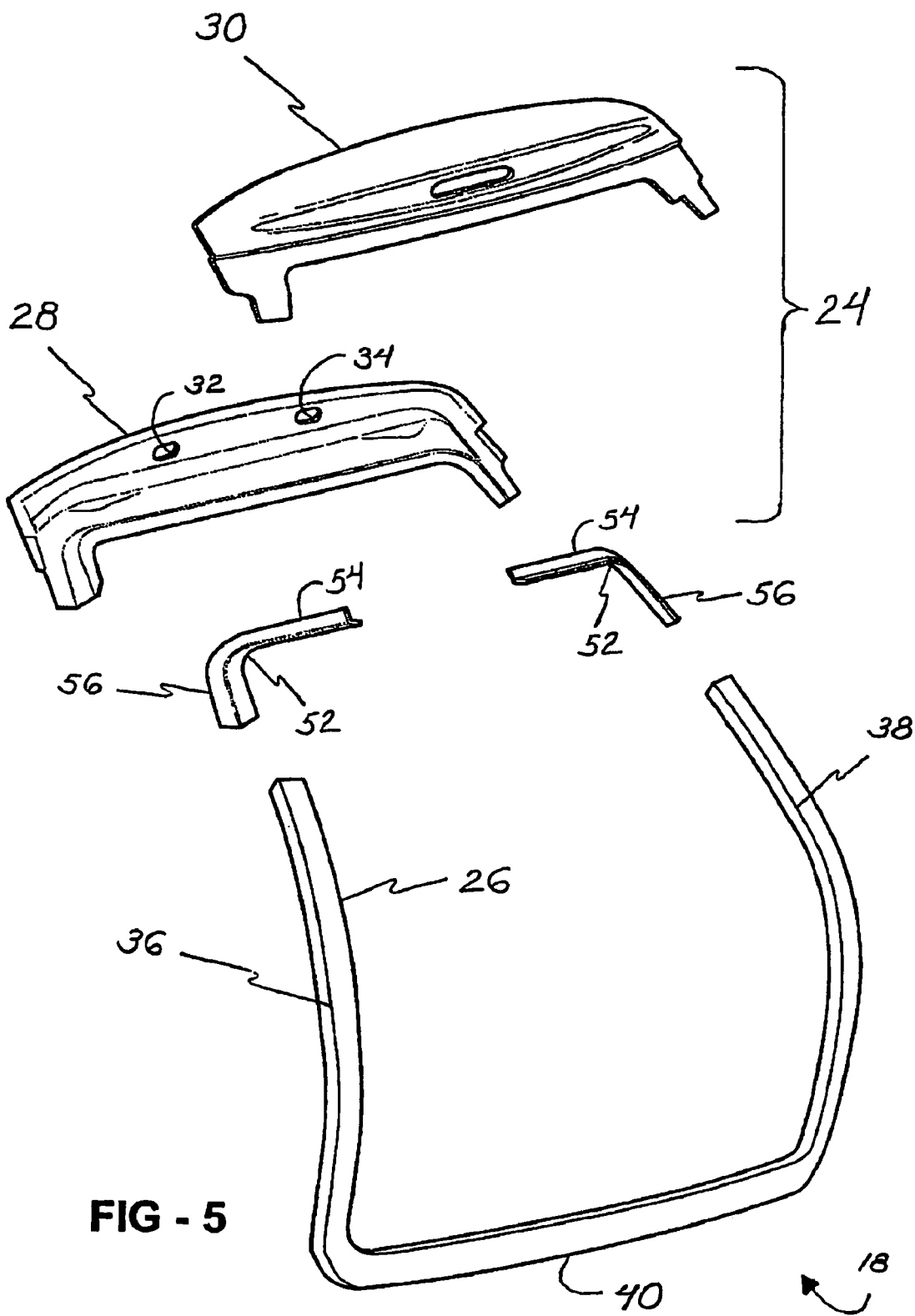
FIG. 5 is an exploded, rear perspective view of the liftgate frame.
Figure 6:
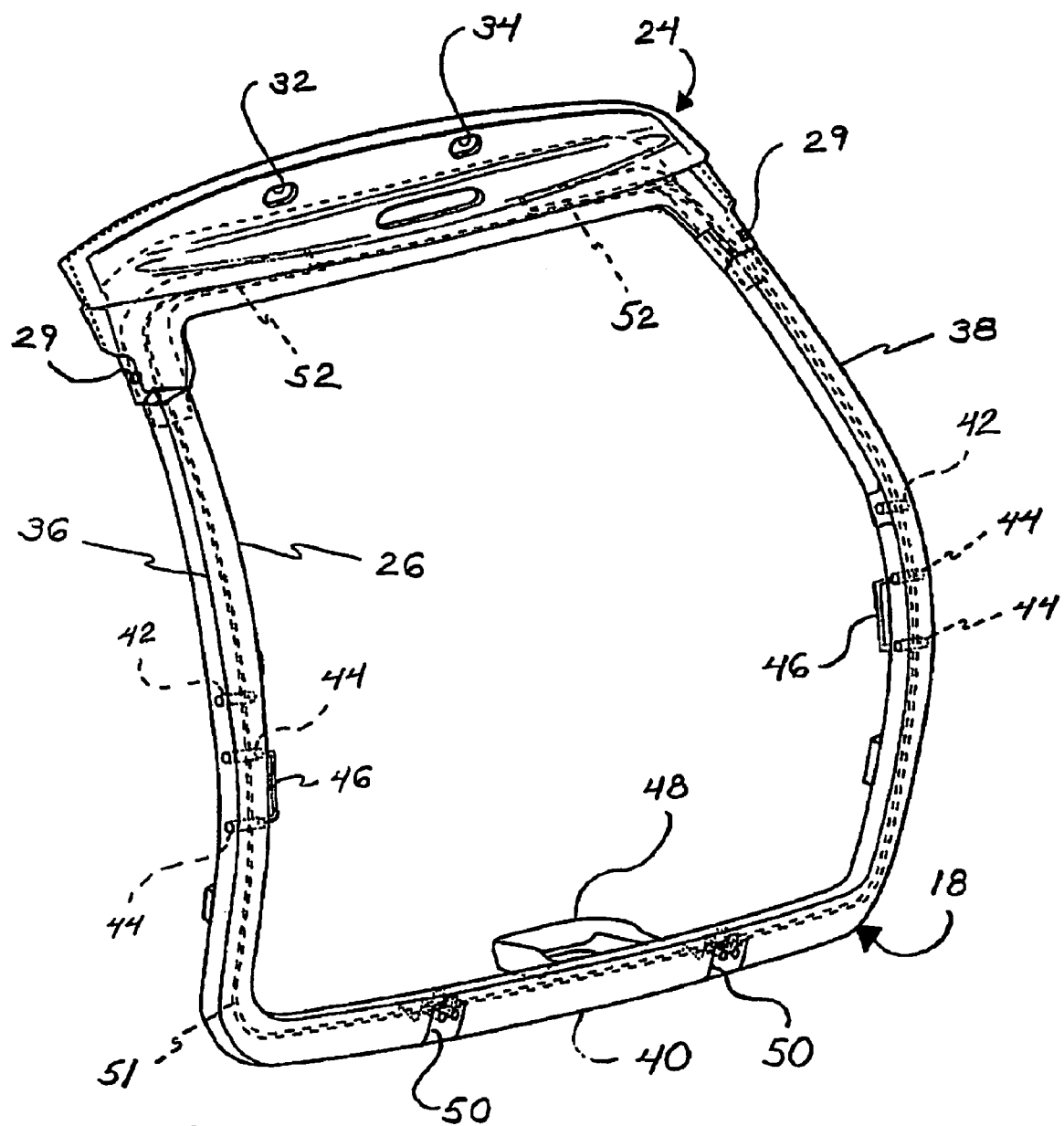
FIG. 6 is a rear perspective view of the liftgate frame.

Referring to FIGS. 5 and 6, the frame 18 includes an upper frame member or header, generally shown at 24, and a generally U-shaped lower frame member 26. The upper frame member 24 extends across the rear portion 14 of the motor vehicle 16 above the opening 12 thereof. The upper frame member 24 includes an inner header panel 28 and an outer header panel 30, both of which may be formed from a stamping operation.

The inner header panel 28 is pivotally secured to the motor vehicle 16 by frame hinge mechanisms 33, 35 (shown in FIG. 7) of a suitable type. The outer header panel 30 is fixedly secured to the inner header panel 28 by welding or a similar method. The outer header panel 30 includes weld nuts 29 positioned therealong (shown in FIG. 6).

The lower frame member 26 is fixedly secured to the upper frame member 24. Together, the upper 24 and lower 26 frame members form a ring structure extending all around the opening 12 at the rear portion 14 of the motor vehicle 16.

The lower frame member 26 is integrally formed, and includes spaced apart, generally upright segments 36, 38 and a horizontal segment 40 extending therebetween. Each of the upright segments 36, 38 has a non-planar contour that allows the frame 18 to conform to the rear portion 14 of the motor vehicle 16.

Referring to FIG. 6, each of the upright segments 36, 38 includes cylindrical rod sleeves 42 and cylindrical striker sleeves 44 formed therealong. The rod sleeves 42 retain one end of a prop rod 37 (shown in FIG. 2). The prop rod 37 extends between each vertical segment 36, 38 and the motor vehicle 16. The prop rod 37 assists in pivotal movement of the frame 18. More specifically, the prop rod 37 prevents overtravel of the frame 18 as the frame 18 pivots away from the motor vehicle 16. The striker sleeves 44 along each of the vertical segments 36, 38 house a frame striker 46, described in greater detail below.

The horizontal segment 40 of the lower frame member 26 includes a frame latch 48. The frame latch 48 engages a rear striker (not shown) located at the rear portion 14 of the motor vehicle 16 to lock the frame 18 thereto. More specifically, the frame latch 48 is engaged by the rear striker when the liftgate 10 is in the closed position, the window open position, and the tailgate open position in order to prevent pivoting of the frame 18 relative to the motor vehicle 16. At the same time, the engagement of the frame latch 48 to the rear striker does not prevent the window 20 and the tailgate 22 from pivoting relative to the frame 18. The horizontal segment 40 also includes tailgate hinge mechanisms 50 of a suitable type for pivoting the tailgate 22 relative to the frame 18.

Preferably, the lower frame member 26 is formed by tubular hydroforming, as is known to those skilled in the art. The tubular lower frame member 26 is formed from steel or aluminum. The tubular hydroforming process results in the lower frame member 26 having a cross-section that provides for rear visibility out the window 20.

Still referring to FIG. 6, the tubular lower frame member 26 may house electrical wiring 51 therein. The electrical wiring 51 is routed from the motor vehicle 16 to the lower frame member 26 through openings 32, 34. The electrical wiring 51 is operably connected to a motor (not shown) for moving the frame 18 and/or the tailgate 22. In addition, the electrical wiring 51 supplies power to ancillary equipment such as tail lights and wiper motors (both not shown).

Referring once again to FIGS. 5 and 6, a generally L-shaped reinforcement member 52 extends between the upper frame member 24 and one of the vertical segments 36, 38 for reinforcing the joint between the upper 24 and lower 26 frame members. More specifically, a first portion 54 of the reinforcement member 52 is fixedly secured to the inner 28 and outer 30 header panels of the upper frame member 24, and a second portion 56 of the reinforcement member 52 is fixedly secured within one of the tubular vertical segments 36, 38.

Figure 7:
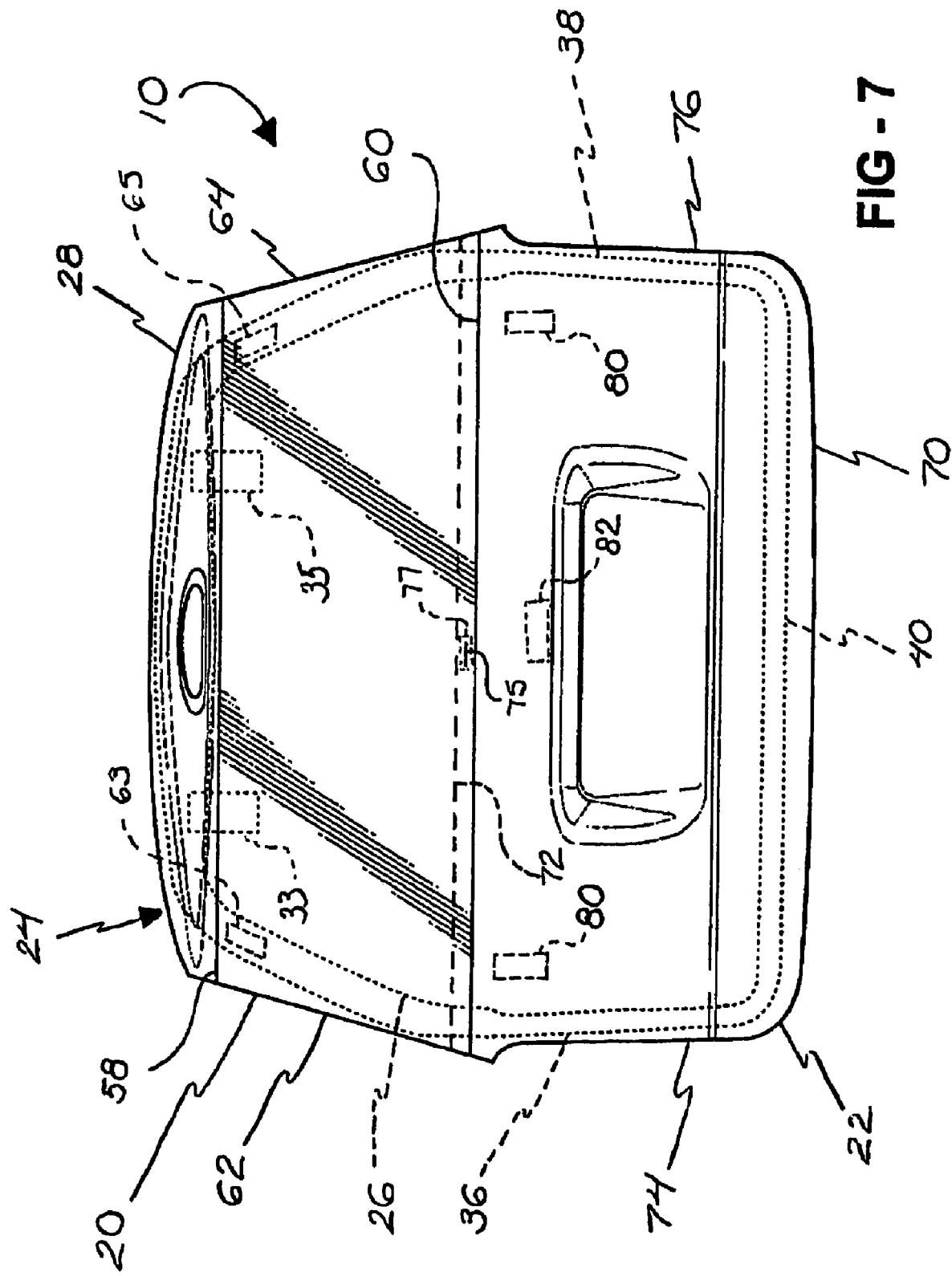
FIG. 7 is a rear view of the liftgate showing a window and a tailgate disposed along the liftgate frame.

Referring to FIG. 7, the window 20 includes an upper edge 58, a lower edge 60, and sides 62, 64 extending therebetween. The upper edge 58 of the window 20 is disposed along the upper frame member 24, and the sides 62, 64 of the window 20 are disposed along the vertical segments 36, 38. The window 20 is pivotally hinged to the frame 18 by window hinge mechanisms 63, 65 of a suitable type. It will be appreciated that as long as the window hinge mechanisms 63, 65 can be suitably attached to the frame 18 at various locations therealong.

A window prop rod 66, shown in FIGS. 3 and 4, extends between each side 62, 64 of the window 20 and the frame 18 for limiting the path of travel of the window 20 in the upwards direction. One end of the window prop rod 66 is secured to a rod support 68 located along the window 20. The other end of the window prop rod 66 is secured to one of the weld nuts 29 along the frame 18.

Referring again to FIG. 7, the tailgate 22 includes a lower edge 70, an upper edge 72, and opposing sides 74, 76 extending therebetween. The lower edge 70 of the tailgate 22 is disposed adjacent the horizontal segment 40 of the lower frame member 26; the upper edge 72 of the tailgate 22 is disposed adjacent the lower edge 60 of the window 20; and the sides 74, 76 are disposed along the vertical segments 36, 38. When the liftgate 10 is in the closed and open positions, the lower edge 60 of the window 20 overlaps the upper edge 72 of the tailgate 22 to prevent pivoting of the tailgate 22 while the window 20 is closed. To this end, the window 20 includes a window striker 75 selectively engaging a tailgate latch 77 of a suitable type to hold the window 20 and the tailgate 22 in an abutting relationship with one another.

With the window 20 open, the tailgate 22 is able to be pivoted about the tailgate hinge mechanisms 50 along the horizontal segment 40. A cable 78, shown in FIG. 4, extends between the frame 18 and the tailgate 22 to prevent overtravel of the tailgate 22 as it pivots away from the frame 18. The tailgate 22 may include an internal rotational spring mechanism or strut 80 of a suitable type secured to one end of the cable 78. The spring mechanism 80 is also secured to the tailgate 22 and dampens downward movement of the tailgate 22 away from the frame 18.

Referring once again to FIG. 7, the tailgate 22 optionally includes an electronic switching module or brainplate 82, which creates signals indicating the position of the liftgate 10. When the liftgate 10 is in the open position, the brainplate 82 emits a signal to a controller (not shown) to prevent movement of the window 20 and the tailgate 22 relative to the frame 18. The brainplate 82 also signals the controller to restrict movement of the window 20 until the liftgate 10 is in the closed position. In addition, the brainplate 82 will signal the controller both that the frame 18 is sealingly engaging the motor vehicle 16 and that the window 20 is open before allowing the tailgate 22 to open. Further, the brainplate 82 is able to generate a signal to initiate power release of the tailgate latch 77.

The tailgate 22 may be formed from a lightweight metal, such as aluminum, or a composite material to contribute to weight reduction of the liftgate 10. Utilization of such a lightweight metal or composite material is made possible by the underlying frame 18, including the tubular hydroformed lower frame member 26, which provides the necessary structural support for the liftgate 10.

The liftgate 10 includes various sealing members to provide a tight engagement between moving parts. Referring back to FIG. 2, the motor vehicle 16 includes a flange 84 extending around the opening 12. A flange seal 86 extends along the flange 84 in order to seal the frame 18 with the motor vehicle 16 when the liftgate 10 is in the closed, window open, and tailgate open positions. The sealing of the frame 18 to the motor vehicle 16 reduces noise and prevents moisture from entering the motor vehicle 16.

Referring to FIG. 3, the upper edge 72 of the tailgate 22 includes a horizontal seal 88 extending therealong for sealingly engaging the window 20.

Referring to FIG. 4, an outer sealing member 90 extends along an outboard surface 92 of the upper 24 and lower 26 frame members. The outer sealing member 90 is retained along the outboard surface 92 by an adhesive. The outer sealing member 90 sealingly engages the window 20 and/or the tailgate 22 when the liftgate 10 is in the open, closed, or window open positions. In a preferred embodiment, the outer sealing member 90 is a one-piece ring-shaped seal.

The multiple opening positions of the liftgate 10 provide a user with various options during loading and unloading of items. For example, a user may decide to open only the window 20 for loading and unloading smaller items. Since the window 20 is relatively lightweight, a minimal amount of effort is required to open the window 20.

With the window 20 open, the user may pivot the tailgate 22 relative to the frame 18 to move the liftgate 10 into the tailgate open position, as shown in FIG. 4. In the tailgate open position, the tailgate 22 is generally co-planar with a floor 94 of the motor vehicle 16, which is useful during "tailgating" or other activities. In addition, a supplemental latch mechanism (not shown) may be provided to secure the window 20 in a closed position while the liftgate 10 is in the tailgate open position in order to store and transport items that extend out past an interior length of the motor vehicle 16.

The liftgate 10 may be moved into the open position, shown in FIG. 2, directly from the closed position by pivoting the frame 18 relative to the motor vehicle 16. The open position is advantageous over the tailgate open position for two reasons. First, since moving the liftgate 10 into the open position involves pivoting the frame 18, the entire opening 12 is accessible from outside the motor vehicle 16. Second, the tailgate 22 is not extending out past the floor 94. Thus, when loading or unloading particularly heavy items, the extra work involved in moving the item over the tailgate 22 and into or off of the motor vehicle 16 is eliminated.

The liftgate 10 utilizes the same attachment points as a conventional liftgate. Thus, the liftgate 10, including the frame 18, the window 20, and the tailgate 22, may be utilized as a "drop in" option during the motor vehicle assembly process.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A liftgate frame for a liftgate of a motor vehicle, the frame assembly comprising:
    an upper frame member having an inner header panel fixedly secured to an outer header panel and adapted to be pivotally secured to the motor vehicle;
    a separate generally U-shaped, integrally formed lower frame member fixedly attached to the upper frame member, the lower frame member including spaced apart vertical segments and a horizontal segment extending between the vertical segments for supporting the liftgate as the liftgate opens and closes; and
    a reinforcement member having a first portion fixedly secured to the inner header panel and the outer header panel, the reinforcement member having a second portion fixedly secured to one of the vertical segments for reinforcing the attachment between the upper and lower frame members.

2. The liftgate frame of claim 1 wherein the first portion of the reinforcement member extends substantially perpendicularly from the second portion.

3. The liftgate frame of claim 1 wherein the lower frame is tubular, the second portion of the reinforcement member being at least partially positioned within the tubular lower frame.

4. The liftgate frame of claim 1 wherein the reinforcement member includes a substantially "L"-shaped cross-section.

5. A liftgate frame for a liftgate of a motor vehicle, the frame assembly comprising:
    an upper frame member having an inner header panel fixedly secured to an outer header panel and adapted to be pivotally secured to the motor vehicle;
    a generally U-shaped, integrally formed lower frame member fixedly secured to the upper frame member, the lower frame member including spaced apart vertical segments and a horizontal segment extending between the vertical segments for supporting the liftgate as the liftgate opens and closes; and
    a reinforcement member having a first portion fixedly secured to and overlapping one of the inner header panel and the outer header panel, the reinforcement member having a second portion fixedly secured to one of the vertical segments for reinforcing the attachment between the upper and lower frame members.

6. The liftgate frame of claim 5 wherein the lower frame is tubular, the liftgate frame further including wiring extending through the tubular lower frame.

7. A liftgate frame for a motor vehicle liftgate, the liftgate including a window and a tailgate pivotally coupled to the liftgate frame, the window and tailgate each being moveable between open and closed positions, the liftgate frame comprising:
    an upper frame member adapted to be pivotally coupled to the motor vehicle;
    a separate substantially U-shaped, one piece, tubular lower frame member having terminal ends fixed to the upper frame member forming an uninterrupted ring surrounding an opening, the ring being moveable between open and closed positions;
    a window hinge coupled to the liftgate frame and adapted to rotatably couple the window to the liftgate frame;
    a tailgate hinge coupled to the liftgate frame and adapted to rotatably couple the tailgate to the liftgate frame, wherein the opening is adapted to be unobstructed when the window and the tailgate are each in the open position.

8. The liftgate frame of claim 7 wherein the upper frame member includes spaced apart vertically extending end segments forming a portion of the ring.

9. The liftgate frame of claim 8 wherein the upper frame member includes an inner header panel fixed to an outer header panel.

10. The liftgate frame of claim 9 further including a reinforcement member having a first portion fixedly secured to and overlapping the inner header panel and the outer header panel, the reinforcement member having a second portion fixedly secured to and overlapping the lower frame member for reinforcing the attachment between the upper and lower frame members.

11. The liftgate frame of claim 10 wherein the second portion of the reinforcement member is at least partially positioned within the tubular lower frame.

12. The liftgate frame of claim 11 wherein the first portion of the reinforcement member extends substantially perpendicularly from the second portion.

13. The liftgate frame of claim 7 further including an electronic module coupled to the liftgate and adapted to output a signal indicative of the position of the liftgate frame, the window and the tailgate.

14. The liftgate frame of claim 7 further including wiring extending through the tubular lower frame.

15. A liftgate frame for a motor vehicle liftgate having a window and a tailgate moveable relative to the liftgate frame between open and closed positions, the liftgate frame comprising:
    an upper frame member having an inner header panel with a substantially constant thickness fixedly secured to an outer header panel with a substantially constant thickness, the upper frame member being adapted to be pivotally secured to the motor vehicle;
    a separate generally U-shaped, one-piece lower frame member fixedly secured to the upper frame member, the lower frame member including spaced apart vertical segments and a horizontal segment extending between the vertical segments for supporting the liftgate as the liftgate opens and closes; and
    a tailgate hinge coupled to the horizontal segment of the lower frame member and adapted to pivotally interconnect the tailgate and the lower frame member.

16. The liftgate frame of claim 15 further including a window hinge coupled to the liftgate frame and adapted to pivotally interconnect the window and the upper frame member.

17. The liftgate frame of claim 16 wherein the tailgate hinge and the window hinge are adapted to allow the window and the tailgate to rotate about parallel axes.

18. The liftgate frame of claim 17 further including a frame latch fixed to the horizontal segment of the lower frame member.

19. The liftgate frame of claim 15 further including a reinforcement member having a first portion fixedly secured to the inner header panel and the outer header panel, the reinforcement member having a second portion fixedly secured to one of the vertical segments for reinforcing the attachment between the upper and lower frame members, wherein the reinforcement member includes a substantially "L"-shaped cross-section.

20. The liftgate frame of claim 15 wherein the lower frame is tubular, the second portion of the reinforcement member being at least partially positioned within the tubular lower frame.

21. The liftgate frame of claim 15 wherein the lower frame is tubular, the liftgate frame further including wiring extending through the tubular lower frame.

22. A liftgate frame as set forth in claim 15 wherein the lower frame member is formed by tubular hydroforming of a metal material.

* * * * *